(12) United States Patent
Golman et al.

(10) Patent No.: US 12,168,413 B1
(45) Date of Patent: Dec. 17, 2024

(54) DEPLOYABLE STRUCTURE WITH REACTION FEATURES

(71) Applicants: Adam J. Golman, Glen Allen, VA (US); Arturo Llamazares Domper, San Jose, CA (US); Nicholas A. White, Sunnyvale, CA (US); Jesse T. Buehler, Portola Valley, CA (US)

(72) Inventors: Adam J. Golman, Glen Allen, VA (US); Arturo Llamazares Domper, San Jose, CA (US); Nicholas A. White, Sunnyvale, CA (US); Jesse T. Buehler, Portola Valley, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 18/213,411

(22) Filed: Jun. 23, 2023

Related U.S. Application Data

(63) Continuation of application No. 17/316,897, filed on May 11, 2021, now Pat. No. 11,713,018.

(60) Provisional application No. 63/024,048, filed on May 13, 2020.

(51) Int. Cl.
  *B60R 21/231* (2011.01)
  *B60N 2/02* (2006.01)
  *B60R 21/26* (2011.01)

(52) U.S. Cl.
  CPC ...... *B60R 21/23138* (2013.01); *B60N 2/0224* (2013.01); *B60R 21/26* (2013.01)

(58) Field of Classification Search
  CPC ............... B60N 2/20224; B60R 21/26; B60R 21/23138
  See application file for complete search history.

(56) References Cited

U.S. PATENT DOCUMENTS

| | | |
|---|---|---|
| 6,024,377 A | 2/2000 | Lane, Jr. |
| 7,663,502 B2 | 2/2010 | Breed |
| 8,505,966 B2 | 8/2013 | Yoo |
| 9,227,531 B2 | 1/2016 | Cuddihy et al. |
| 9,446,735 B1 | 9/2016 | Jayasuriya et al. |
| 9,789,840 B2 | 10/2017 | Farooq et al. |
| 9,994,181 B1 | 6/2018 | Dubaisi et al. |
| 10,065,592 B2 | 9/2018 | Jaradi et al. |
| 10,336,275 B2 | 7/2019 | Sundararajan et al. |
| 10,343,644 B2 | 7/2019 | Dry et al. |
| 10,414,372 B2 | 9/2019 | Nagasawa et al. |
| 10,493,941 B2 | 12/2019 | Szawarski et al. |
| 10,703,321 B2 | 7/2020 | Deng et al. |
| 11,554,739 B1 * | 1/2023 | Jaradi ............... B60R 21/01512 |
| 2008/0012275 A1 | 1/2008 | Pinsenschaum et al. |
| 2009/0001695 A1 | 1/2009 | Suzuki et al. |
| 2012/0119475 A1 * | 5/2012 | Choi ................ B60R 21/23138 280/729 |

(Continued)

FOREIGN PATENT DOCUMENTS

| | | |
|---|---|---|
| DE | 102018120450 A1 | 3/2019 |
| DE | 102018125554 A1 | 4/2019 |
| KR | 100783910 B1 * | 12/2006 |

*Primary Examiner* — Karen Beck

(74) *Attorney, Agent, or Firm* — Young Basile Hanlon & MacFarlane, P.C.

(57) ABSTRACT

A device includes a body structure, a seat assembly that is connected to the body structure, and an inflatable structure. The inflatable structure includes one or more surfaces that are configured to react forces by engaging with a first feature to control motion of a second feature.

20 Claims, 11 Drawing Sheets

(56) References Cited

U.S. PATENT DOCUMENTS

| | | | |
|---|---|---|---|
| 2016/0052636 A1* | 2/2016 | Moeller | B64D 25/02 244/121 |
| 2016/0280178 A1 | 9/2016 | Kruse | |
| 2017/0259772 A1* | 9/2017 | Farooq | B60R 21/26 |
| 2018/0201211 A1* | 7/2018 | Gandhi | B60R 21/01 |
| 2018/0222432 A1 | 8/2018 | Schneider | |
| 2019/0054890 A1* | 2/2019 | Kwon | B60R 21/2338 |
| 2019/0092264 A1 | 3/2019 | Spahn et al. | |
| 2019/0111877 A1 | 4/2019 | Line et al. | |
| 2019/0161045 A1 | 5/2019 | Thomas et al. | |
| 2019/0161050 A1 | 5/2019 | Schneider | |
| 2019/0248322 A1 | 8/2019 | Herzenstiel et al. | |
| 2020/0017058 A1 | 1/2020 | Jaradi et al. | |
| 2020/0247356 A1 | 8/2020 | Hoernke et al. | |
| 2020/0307484 A1 | 10/2020 | Adler | |
| 2020/0307495 A1 | 10/2020 | Jimenez et al. | |
| 2020/0307496 A1 | 10/2020 | Jimenez et al. | |
| 2020/0361410 A1 | 11/2020 | Jayakar et al. | |
| 2020/0377052 A1 | 12/2020 | Youssef-Agha et al. | |
| 2020/0391688 A1 | 12/2020 | Schroeder et al. | |
| 2020/0391689 A1 | 12/2020 | Fischer et al. | |
| 2020/0391691 A1 | 12/2020 | Fischer et al. | |
| 2020/0406852 A1 | 12/2020 | Fischer et al. | |
| 2021/0078517 A1* | 3/2021 | Fischer | B60R 21/01516 |
| 2021/0213904 A1* | 7/2021 | Parker | B60R 21/207 |
| 2021/0268987 A1* | 9/2021 | Choi | B60R 21/2338 |
| 2022/0009443 A1* | 1/2022 | Fischer | B60R 21/013 |
| 2022/0097644 A1 | 3/2022 | Jaradi et al. | |
| 2022/0203923 A1 | 6/2022 | Jaradi et al. | |
| 2022/0355755 A1* | 11/2022 | Fischer | B60R 21/2338 |

\* cited by examiner

DEPLOYABLE STRUCTURE WITH REACTION FEATURES

CROSS-REFERENCE TO RELATED APPLICATIONS

This application is a continuation of U.S. patent application Ser. No. 17/316,897, filed on May 11, 2021, which claims the benefit of U.S. Patent Application Ser. No. 63/024,048, filed on May 13, 2020, the content of which is incorporated herein by reference in its entirety for all purposes.

TECHNICAL FIELD

This disclosure relates generally to deployable structures with reaction features.

BACKGROUND

Inflatable restraints may be used to control motion of an occupant. During deployment, the motion of an inflatable restraint and its ability to control motion and dissipate energy is influenced by engagement of the inflatable restraint with nearby surfaces. These surfaces serve as reaction surfaces that apply reaction forces to the inflatable restraint in opposition to forces associated with engagement of the occupant with the inflatable restraint. Examples of structures that may serve as reaction surfaces include a windscreen, a dashboard, and a knee bolster.

SUMMARY

One aspect of the disclosure is a vehicle includes a body structure, a seat assembly that is connected to the body structure, an airbag assembly that includes a housing that is located behind a first portion of the body structure and an airbag. The airbag is located in the housing in a stowed position and extends outward relative to the housing in an inflated position. The airbag includes a main chamber that is located adjacent to the seat assembly in the inflated position, and a reaction chamber that is spaced from the seat assembly by the main chamber in the inflated position. The airbag is configured so that forces that are applied to the main chamber of the airbag in a longitudinal direction of the vehicle cause the reaction chamber to move in a lateral direction of the vehicle so that the reaction chamber engages the body structure of the vehicle.

In some implementations, the airbag includes an internal interface that separates the main chamber of the airbag from the reaction chamber of the airbag. The internal interface may include structures that allow controlled gas flow between main chamber and reaction chamber. The internal interface may block gas flow between the main chamber and the reaction chamber.

A first gas pressure in the reaction chamber may be higher than a second gas pressure in the main chamber when the airbag is in the inflated position. At least part of the reaction chamber of the airbag may be spaced from the main chamber of the airbag in the longitudinal direction of the vehicle by an open space. The airbag may include an internal interface that separates the main chamber of the airbag from the reaction chamber of the airbag and the internal interface of the airbag is laterally adjacent to the open space. The airbag may include a tether that is connected to the airbag adjacent to the main chamber and is connected to the airbag adjacent to the reaction chamber so that the tether extends across the open space.

In some implementations, the first portion of the body structure may be at least one of a door panel or a wall panel of the body structure.

Another aspect of the disclosure is a vehicle that includes a body structure, a seat assembly, a seat positioner, an airbag assembly, and an airbag positioner. The seat positioner is connected to the body structure and to the seat assembly, wherein the seat positioner is configured to move the seat assembly with respect to the body structure. The airbag assembly includes a housing and an airbag, wherein the airbag is located in the housing in a stowed position and extends outward relative to the housing in an inflated position, and the airbag is configured to react forces applied to the airbag as a result of longitudinal motion of a passenger by lateral motion of a reaction feature into engagement with the body structure; and an airbag positioner that is configured to move the airbag assembly with respect to the body structure and the seat assembly.

The airbag positioner is may be configured to move the airbag toward a predetermined positional relationship with respect to the seat assembly prior to movement of the airbag from the stowed position to the inflated position. The seat positioner may be configured to move the seat assembly with respect to the vehicle body in a longitudinal direction of the vehicle, and the airbag positioner is configured to move the airbag with respect to seat assembly and the vehicle body in the longitudinal direction of the vehicle.

In some implementations, the airbag includes a main chamber that is located adjacent to the seat assembly in the inflated position, and a reaction chamber that is spaced from the seat assembly by the main chamber in the inflated position and defines the reaction feature so that the reaction feature is configured to move laterally into engagement with a portion of the body structure in response to the forces applied to the airbag as a result of the longitudinal motion of the passenger. The airbag may include an internal interface that separates the main chamber of the airbag from the reaction chamber of the airbag.

In some implementations, the airbag is concealed behind at least one of a side wall panel, a door panel, a ceiling panel, or a floor panel prior to movement of the airbag from the stowed position to the inflated position.

One aspect of the disclosure is a vehicle that includes a body structure, a seat assembly, and a seat positioner that is connected to the body structure and to the seat assembly, wherein the seat positioner is configured to move the seat assembly with respect to the body structure. The airbag assembly includes a housing and an airbag, wherein the airbag is located in the housing in a stowed position and extends outward relative to the housing in an inflated position. The airbag is configured to react forces applied to the airbag as a result of longitudinal motion of a passenger by lateral motion of a reaction feature into engagement with the body structure. The airbag is connected to a portion of the seat assembly to move in unison with the seat in the longitudinal direction of the vehicle in accordance with operation of the seat positioner.

In some implementations, the airbag includes a main chamber that is located adjacent to the seat assembly in the inflated position and a reaction chamber that is spaced from the seat assembly by the main chamber in the inflated position. The reaction chamber defines the reaction feature so that the reaction feature is configured to move laterally into engagement with a portion of the body structure in response to the forces applied to the airbag as a result of the longitudinal motion of the passenger.

The airbag may include an internal interface that separates the main chamber of the airbag from the reaction chamber of the airbag. The seat positioner may be configured to move the seat assembly with respect to the vehicle body in a longitudinal direction of the vehicle. The airbag may be connected to at least one of a seat pan, a seat back, an armrest, a head rest, or lap belt of the seat assembly.

DETAILED DESCRIPTION

In the safety systems described herein, airbags are used in connection with seats that are located in a passenger cabin of a vehicle. The seats may be at fixed locations or at variable locations (e.g., movable over a relatively large distance) within the passenger cabin of the vehicle. Dependent on the fixed or variable location of the seat, it may be spaced, in at least a first direction, away from other structures in the passenger cabin by a distance that prevents those surfaces from being used as reaction surfaces for airbags.

The safety systems that are described herein include airbags having reaction features that react passenger motion in a longitudinal (e.g., fore-aft) direction of the vehicle by incorporating features that react the longitudinal loads against surfaces that are located other than longitudinally forward relative to the passenger.

In some implementations, the safety systems described herein are used in fully autonomous vehicles that do not have a human driver. Because there is no human driver present in the vehicle, the seat configurations are not limited by the need to position a human driver at a location that is suitable for placement of vehicle controls.

Figure 1:
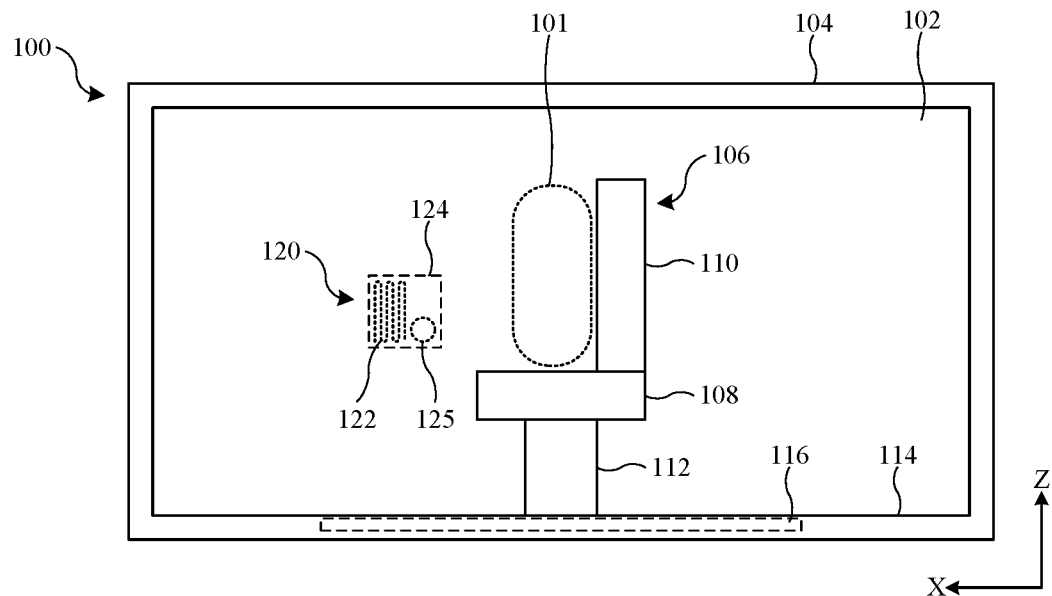
FIG. 1 is a schematic side view illustration of a vehicle that includes a passenger cabin.
Figure 2:
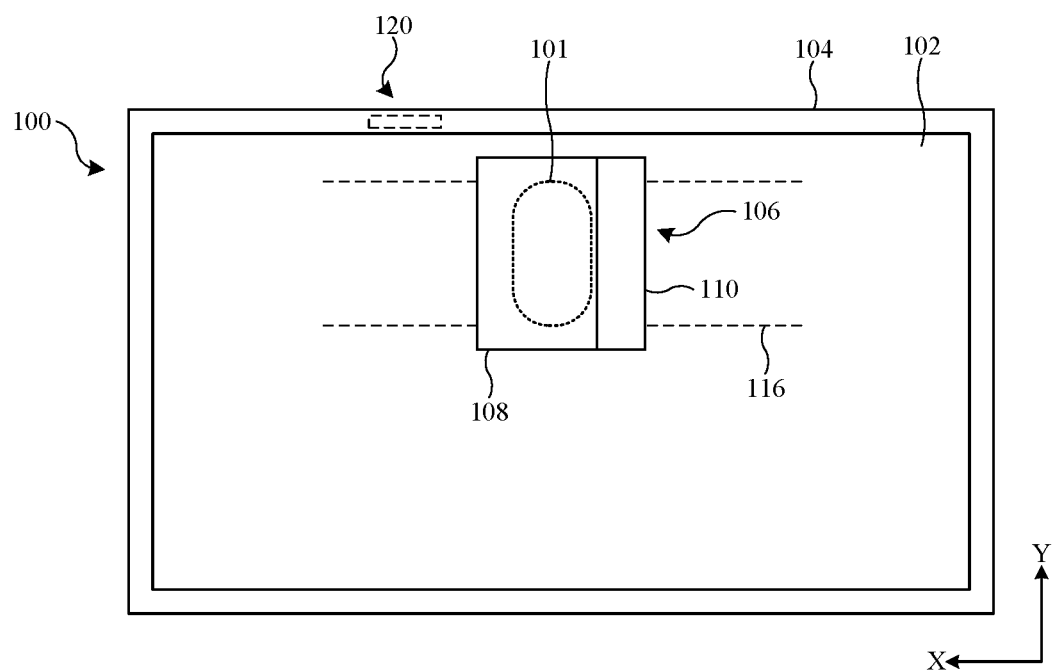
FIG. 2 is a schematic top view illustration of the vehicle.

FIG. 1 is a schematic side view illustration of a vehicle 100 that includes a passenger cabin 102 inside a body structure 104 of the vehicle 100. FIG. 2 is a schematic top view illustration of the vehicle. The vehicle 100 will be described with reference to a longitudinal direction X (e.g., fore-aft), a lateral direction Y (e.g., side to side), and an elevational direction Z (e.g., up-down).

The vehicle 100 may be a road-going vehicle that is supported by wheels and is able to travel freely upon roadways and other surfaces in accordance with a velocity, heading angle, and steering angle of the vehicle 100. The passenger cabin 102 is a space where a passenger 101 is located when traveling in the vehicle 100. The passenger cabin 102 is defined in the body structure 104 of the vehicle 100. The body structure 104 may include a frame, subframe, unibody, monocoque, exterior body panels, interior body panels (e.g., trim panels, upholstery, carpet, etc.), and movable panels (e.g., doors, tailgate, hood, trunk lid, etc.) that are connected to other portions of the body structure 104 by mechanisms such as hinges or tracks.

Interior elements are located in the passenger cabin 102. The interior elements include a seat assembly 106 (which may be referred to herein as a "seat"). The seat assembly 106 includes a seat pan 108, a seat back 110, and a seat support 112. The seat pan 108 and the seat back 110 may each include structures such as rigid frames, springs or other resilient suspension members, cushioning materials (e.g., foam rubber), a seat cover, and/or other structures. The seat pan 108 is configured to be sat on by the user, e.g., including contact with the buttocks and thighs of the passenger 101. The seat back 110 extends upward from the seat pan 108 and may be pivotally connected to the seat back 110 to allow adjustment of a recline angle. The seat back 110 is configured for engagement with the passenger 101, e.g., with the hips, torso, shoulders, neck, and/or head of the passenger 101. The seat support 112 is connected to the seat pan 108 and/or the seat back 110 to support the remainder of the seat assembly 106 in a spaced relationship above a floor 114 of the passenger cabin 102.

The seat assembly 106 is connected to the body structure 104. In the illustrated example, the seat assembly 106 is connected to the floor 114 by a seat positioner 116 that allows movement of the position of the seat assembly 106 over a wide range of locations within the passenger cabin 102. The seat positioner 116 may be actuated by a powered actuator, such as an electromechanical actuator or a magnetic actuator, that is controllable by signals from a computing device or other control device and allows for active adjustment of the position of the seat assembly 106, for example, in response to commands originating from a user or in response to commands originating from an automated control system (e.g., that moves the seat according to sensed conditions using control instructions such as an algorithm).

The seat positioner 116 may include rails, tracks, electromagnets, or any other structure that can connect the seat assembly 106 to the floor 114 in a manner that allows for motion of the seat assembly 106 with respect to the floor 114. In the illustrated example, the seat positioner 116 is configured to move the seat assembly 106 in the lateral direction X within the passenger cabin 102. The seat positioner 116 allows for a greater travel distance for the seat assembly 106 within the passenger cabin 102 as compared to conventional seat adjustment mechanisms. As an example, the seat positioner 116 may be configured to allow movement of the seat assembly 106 over a distance that is at least half of a length of the floor 114 in the longitudinal direction X.

The passenger 101 may sit in the seat assembly 106. A restraint such as a seat belt (not shown) is provided to secure the passenger 101 with respect to the seat assembly 106.

The vehicle 100 includes an airbag assembly 120. FIGS. 1-2 show a pre-deployment condition in which the airbag assembly 120 is in a stowed position. As examples, the airbag assembly 120 may include an airbag 122, a housing 124, and an inflator 125 that is configured to supply gas to the airbag 122 to move the airbag 122 from the stowed position to an inflated position. In the stowed position, the airbag 122 is located in the housing 124, for example, in a folded position. In FIGS. 1-2, the airbag assembly 120 is located in part of the body structure 104 of the vehicle 100. As an example, the housing 124 of the airbag assembly 120 may be located behind a first portion of the body structure 104 so that the airbag is located in the housing 124 behind the first portion of the body structure 104 in the stowed position and extends outward relative to the housing 124 and the first portion of the body structure 104 in the inflated position. The airbag 122 is defined using flexible material, including non-porous and porous materials, internal baffles, tethers, and other known elements. The particular configuration of the airbag 122, as inflated, is not conventional and will be explained further herein.

Figure 3:
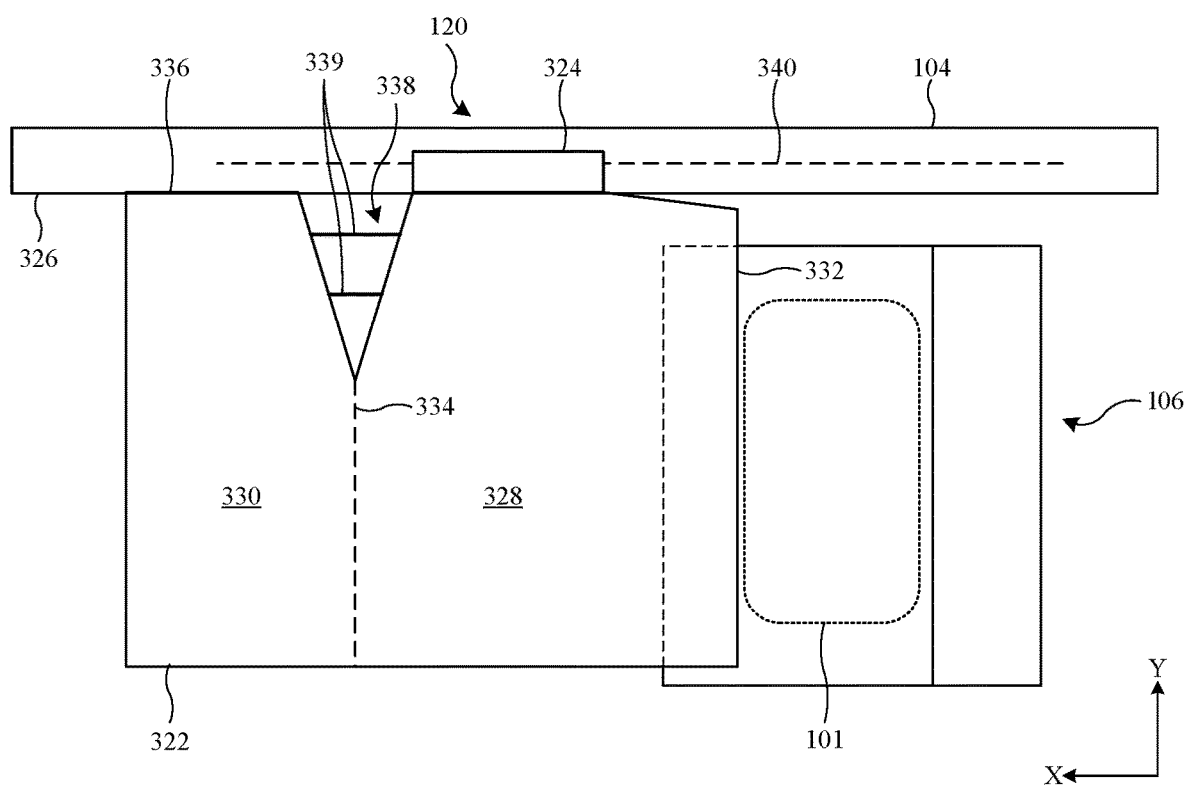
FIG. 3 is a schematic top view illustration of the vehicle including an airbag in an inflated position.

FIG. 3 is a schematic top view illustration that shows a post-deployment condition in which the inflator 125 of the airbag assembly 120 has been activated to inflate the airbag 122, so that the airbag 122 is in the inflated position in FIG. 3. The illustrated example, the housing 124 of the airbag assembly 120 is located in a side portion 326 of the body structure 104 (e.g., behind a surface that forms part of the side portion 326). The side portion 326 may be a side wall that is included in the body structure 104. The side portion 326 may be a door that is included in the body structure 104.

Prior to inflation, the housing 124 is concealed. For example, the housing 124 may be located behind a trim panel or flexible cover that is closed in the pre-inflation condition, but that opens, ruptures, detaches, or otherwise changes position or condition in a way that allows the airbag 122 to expand and extend out of the housing 124 and into the passenger cabin 102 in the deployed condition. As an example, inflation of the airbag 122 may open or rupture the trim panel or covering by application of inflation pressure to the trim panel or covering.

In the inflated position, the airbag 122 extends laterally inward from the side portion 326 of the body structure 104 toward or past a lateral midline of the body structure 104 of the vehicle 100. The airbag 122 includes a main chamber 328 and a reaction chamber 330 that defines a reaction surface 336. The main chamber 328 of the airbag 122 is connected to the housing 124. When inflated, the airbag 122 extends laterally out of the housing 124 in the lateral direction Y to a lateral outer wall of the airbag 122. The term "wall" in this context refers to a panel of flexible material that forms an outer surface of the airbag 122. The airbag 122 also extends in the elevational direction Z between a top wall and bottom wall. The airbag 122 also extends in the longitudinal direction X between a passenger-facing surface 332 and an internal interface 334 between the main chamber 328 and the reaction chamber 330. Thus, in the inflated position, the main chamber 328 is located adjacent to the seat assembly 204 and the passenger 101 and the passenger-facing surface 332 is located adjacent to the seat assembly 204 and the passenger-facing surface 332.

The passenger-facing surface 332 is defined by an exterior wall or panel of the main chamber 328 and is configured so that it is oriented toward the passenger 101 that is seated in the seat assembly 106 during inflation of the airbag 122. The passenger-facing surface 332 is intended to engage the body of the passenger 101 to dissipate kinetic energy in a controlled manner. The passenger-facing surface 332 may be positioned rearward in the longitudinal direction X relative to the housing 124 of the airbag assembly 120 in the inflated position.

The internal interface 334 separates the internal volume of the inflated airbag into two volumes (e.g., gas volumes), including a first volume that is contained in the main chamber 328 and a second volume that is contained in the reaction chamber 330. The internal interface 334 may include an internal wall that separates the main chamber 328 and the reaction chamber 330. In some implementations, there is no gas flow between the main chamber 328 and the reaction chamber 330, and instead the main chamber 328 and the reaction chamber 330 are inflated separately (e.g., through separate inflation passages). In such implementations, the internal interface 334 blocks gas flow between the main chamber 328 and the reaction chamber 330. In some implementations, there is gas flow between the main chamber 328 and the reaction chamber 330 through gas flow structures that allow controlled gas flow between the main chamber 328 and the reaction chamber 330. The gas flow structures may include openings, baffles, restricted passageways, and other connections that allow for limited and/or controlled flow of gas between the main chamber 328 and the reaction chamber 330 of the airbag 122. In implementations that include limited gas flow between the main chamber 328 and the reaction chamber 330, the main chamber 328 and the reaction chamber 330 may be inflated separately, or one of the main chamber 328 and the reaction chamber 330 may be inflated by gas supplied through the other of the main chamber and the reaction chamber 330 (e.g., by supplying gas to the reaction chamber 330 from the main chamber 328 through gas flow structures).

An open space 338 may be defined across part of the width of the airbag 122 in the lateral direction Y. The open space 338 may be aligned with the internal interface in the longitudinal direction X. The open space 338 may be positioned between the main chamber 328 and the reaction chamber 330 adjacent to the side portion 326 of the body structure 104. In the illustrated example, the open space defines spaces part of the main chamber 328 from part of the reaction chamber 330 in the longitudinal direction X, and extends in the lateral direction Y across part of the lateral width of the airbag 122. In the illustrated implementation, the open space 338 extends continuously in the elevational direction Z. However, airbag 122 may instead be configured so that that the open space 338 is not continuous in the elevational direction, for example, by terminating the open space 338 at an intermediate elevational position of the airbag 122 and locating a portion of the internal interface 334 above or below the open space 338. In the illustrated implementation, the open space 338 is generally triangular, with outer surfaces of the airbag 122 converging from a widest distance at a lateral side of the airbag 122 adjacent to the housing 124 and the reaction surface 336 to a narrowest distance (e.g., zero if the walls meet) adjacent to the internal interface 334.

The airbag 122 may include connecting structures 339 that control the position of the reaction chamber 330 with respect to the main chamber 328. The connecting structures 339 extend across the open space from first connection points where the connecting structures are each attached to a part of the airbag 122 (e.g., an exterior surface of a wall facing the open space 338) that defines the main chamber to second connection points where the connecting structures 339 are each attached to a part of the airbag 122 that defines the reaction chamber 330. The connecting structures 339 may be tension-carrying members, such as tethers, that define a maximum spacing of the reaction chamber from the main chamber 328 adjacent to the open space, and therefore define a shape of the open space 338 and a maximum width of the open space 338 (e.g., in the longitudinal direction).

The internal interface 334 may be positioned adjacent to the open space 338 in the lateral direction Y. For example, the internal interface 334 may extend across a first portion of a lateral width of the airbag 122, and the open space 338 may extend across a second portion of the lateral width of the airbag 122. Thus, the internal interface 334 may extend from a first lateral side of the airbag 122 to the open space 338, and the open space 338 may extend from the internal interface 334 to a second lateral side of the airbag (e.g., at the reaction surface 336 and/or the housing 124).

The reaction chamber 330 is positioned forward in the longitudinal direction X relative to the main chamber 328. Part of or all of the reaction chamber 330 is positioned longitudinally forward in the longitudinal direction X relative to the housing 124 of the airbag assembly 120, which places the reaction chamber 330 forward relative to the location at which the airbag 122 is connected to the housing 124 and therefore to a fixed structure of the vehicle, which in this example is the side portion 326 of the body structure 104.

The reaction chamber 330 includes a reaction surface 336, which is a laterally extending surface of the airbag 122 that is positioned adjacent to the side portion 326 of the body structure 104 at a position that is forward in the longitudinal direction X relative to the housing 124 of the airbag assembly 120 when the airbag is inflated. The reaction chamber 330 may be wider in the lateral direction Y than the main chamber 328, with the excess width extending toward the side portion 326 of the body structure 104 to ensure engagement of the reaction surface 336 with the side portion 326 of the body structure 104 in order to react forces from the passenger 101 against the side portion 326. This allows the reaction surface 336 of the reaction chamber 330 to serve as a reaction feature.

The reaction chamber 330 is configured to react forces that are applied to the airbag 122 by engagement of the passenger 101 with the main chamber 328 of the airbag 122. The passenger applies forces to the airbag 122 primarily in the longitudinal direction X. There is typically no fixed structure located adjacent to the reaction chamber 330 in the longitudinal direction X against which the reaction chamber 330 is able to react forces applied by the passenger 101. Because the airbag 122 is fixed to the housing 124, the housing 124 serves as a rotation point, and engagement of the passenger 101 with the passenger-facing surface 332 induces rotation of the airbag 122 around this rotation point. The induced rotation engages the reaction surface 336 of the reaction chamber 330 with the side portion 326 of the body structure 104, thereby reacting the longitudinal force. The open space 338 aids engagement of the reaction surface 336 with the side portion of the body structure 104 by allowing a limited amount of longitudinal motion of the reaction chamber 330 and the reaction surface 336 relative to the main chamber 328 and the housing 124. Thus, the reaction chamber 330 is spaced from the seat assembly 106 by the main chamber 328 in the inflated position, wherein the airbag 122 is configured so that forces that are applied to the main chamber 322 of the airbag 122 in a longitudinal direction of the vehicle 100 cause the reaction chamber 330 to move in the lateral direction Y of the vehicle 100 so that the reaction chamber 330 engages the body structure 104 of the vehicle 100.

The primary functions performed by the main chamber 328 and the reaction chamber 330 are different. The primary function of the main chamber 328 is to dissipate energy in response to forces applied by the passenger 101. The main chamber 328, by itself, has little ability to react those forces. The primary function performed by the reaction chamber 330 is to react the forces applied to the main chamber 328 by the passenger 101. To serve these different functions, gas pressures in the main chamber 328 and the reaction chamber 330 may be controlled in accordance with the intended functions. The gas pressure in the main chamber 328 may be controlled so that it is at a lower pressure value (first pressure value) than a pressure value (second pressure value) in the reaction chamber 330.

Figure 4:
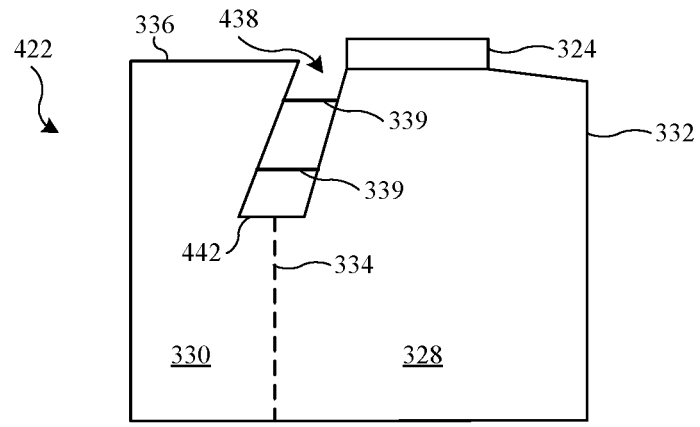
FIG. 4 is an illustration of a first alternative geometric configuration of the airbag.
Figure 5:
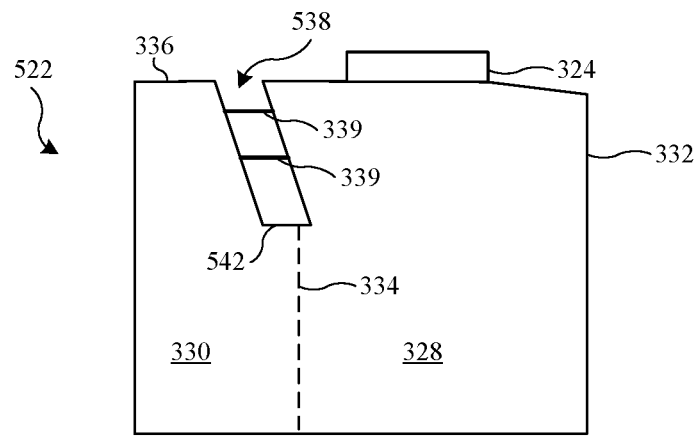
FIG. 5 is an illustration of a second alternative geometric configuration of the airbag.
Figure 6:
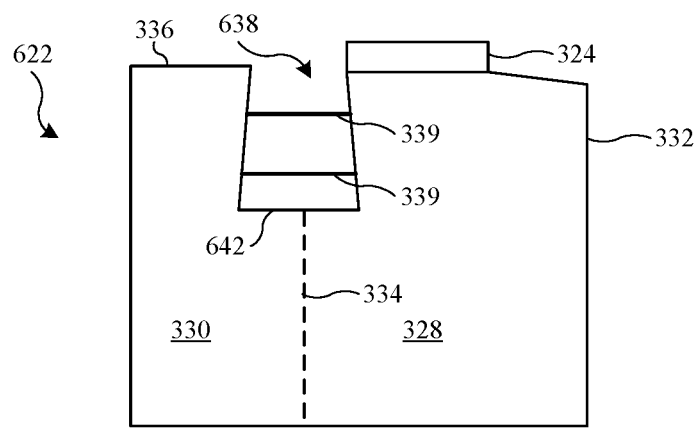
FIG. 6 is an illustration of a third alternative geometric configuration of the airbag.

FIGS. 4-6 are illustrations that shown alternative geometric configurations of the airbag 122. It should be understood that these are non-limiting examples and other geometric configurations can be used for the airbag 122.

FIG. 4 is an illustration an airbag 422, which is a first alternative geometric configuration of the airbag 122 and includes all of the features of the airbag 122 except as stated to the contrary. The airbag 422 is configured as described with respect to the airbag 122 except that that the geometric configuration is modified to define an open space 438 that replaces the open space 338 and includes wall portions adjacent to the main chamber 328 and the reaction chamber 330 that are oriented at an angle relative to the lateral direction so that a wall portion 442 of the airbag 122 where the open space 438 meets the internal interface 334 is located longitudinaly forward relative to the position of the open space 438 adjacent to the side portion 326 (FIG. 3). The wall portions may be parallel or non-parallel relative to each other.

FIG. 5 is an illustration an airbag 522, which is a second alternative geometric configuration of the airbag 122 and includes all of the features of the airbag 122 except as stated to the contrary. The airbag 522 is configured as described with respect to the airbag 122 except that that the geometric configuration is modified to define an open space 538 that replaces the open space 538 and includes wall portions adjacent to the main chamber 328 and the reaction chamber 330 that are oriented at an angle relative to the lateral direction so that a wall portion 542 of the airbag 122 where the open space 538 meets the internal interface 334 is located longitudinally rearward relative to the position of the open space 538 adjacent to the side portion 326 (FIG. 3). The wall portions may be parallel or non-parallel relative to each other.

FIG. 6 is an illustration an airbag 622, which is a second alternative geometric configuration of the airbag 122 and includes all of the features of the airbag 122 except as stated to the contrary. The airbag 622 is configured as described with respect to the airbag 122 except that that the geometric configuration is modified to define an open space 638 that replaces the open space 638 and includes wall portions adjacent to the main chamber 328 and the reaction chamber 330 that are oriented at angles relative to the lateral direction so that a wall portion 642 of the airbag 122 where the open space 338 meets the internal interface 334 is wider in the longitudinal direction than the width of the open space 638 adjacent to the side portion 326 (FIG. 3). Thus, the wall portion adjacent to the main chamber 328 is angled to extend longitudinally rearward from a lateral wall of the airbag 622 that is adjacent to the side portion 326 and faces toward the wall portion 642.

In operation, the airbag assembly 120 is initially in a stowed position. Sensors and, optionally, detection or prediction algorithms are used to determine occurrence of an actual collision or imminent collision, and cause deployment of the airbag 122 in response. The airbag is inflated and thus moved to the inflated position, where the passenger-facing surface 332 is positioned adjacent to the passenger 101 for engagement with the passenger 101, which applies forces to the airbag 122 in the longitudinal direction X. The forces induce rotation of the airbag 122, thereby engaging the reaction surface 336 of the reaction chamber 330 with the side portion 326 of the body structure 104 to react the applied forces.

As previously described, the location of the seat assembly may be adjusted over a large range using the seat positioner 116. Dissipation of energy by the airbag 122 is dependent on the position of the passenger 101 relative to the airbag assembly 120 at the time of a collision. In response to an actual or imminent collision, sensors can be used to determine the position of the passenger 101 with respect to the airbag assembly 120. The sensors may be, as examples, position sensors that are associated with the seat positioner 116, or cameras that are configured to obtain images that show part of the passenger cabin 102, including the passenger 101 and the seat assembly 106. Based on the sensed position, one or more adjustments can be made.

In one implementation, in response to an actual or imminent collision and based on the position of the passenger 101 with respect to the airbag assembly 120 (e.g., in response to determining that a distance from a predetermined position is greater than a threshold value), the seat assembly 106 is moved to a predetermined position relative to the airbag assembly 120 prior to inflation of the airbag assembly 120.

In another implementation, in response to an actual or imminent collision and based on the position of the passenger 101 with respect to the airbag assembly 120 (e.g., difference from a predetermined position is greater than a threshold value), the airbag assembly 120 is moved with respect to the body structure 104 of the vehicle 100 and with respect to the seat assembly 106 of the vehicle 100 by an airbag positioner 340 to a predetermined position relative to the passenger 101 and the seat assembly 106. The airbag positioner 340 is a mechanical device that is connected to the body structure 104 of the vehicle 100, either directly or indirectly, and is configured to move the airbag assembly 120 in one or more degrees of freedom with respect to the body structure 104 of the vehicle 100. As an example, the airbag positioner 340 may include rails that are connected to the body structure 104 of the vehicle 100, and a sliding connection of the airbag assembly 120 to the rails to allow linear movement of the airbag assembly 120 (e.g., in the longitudinal direction X of the vehicle 100) with respect to the body structure 104 of the vehicle 100 under control by actuators (e.g., linear electric motors or rotary electric motors).

The airbag positioner 340 may also be used in alternative implementations in which the airbag 122 deploys from another portion of the body structure 104. As examples, the airbag positioner 340 may be used in implementations in which the airbag assembly, when in the stowed position, is connected to and/or concealed behind a side wall panel, floor panel, a roof panel, a ceiling panel, or another portion of the body structure 104 of the vehicle 100. Thus, the airbag 122 may be deployed in a consistent, predetermined positional relationship with respect to the seat assembly 106 by connection of the airbag assembly to the airbag positioner 340 in multiple configurations.

Figure 7:
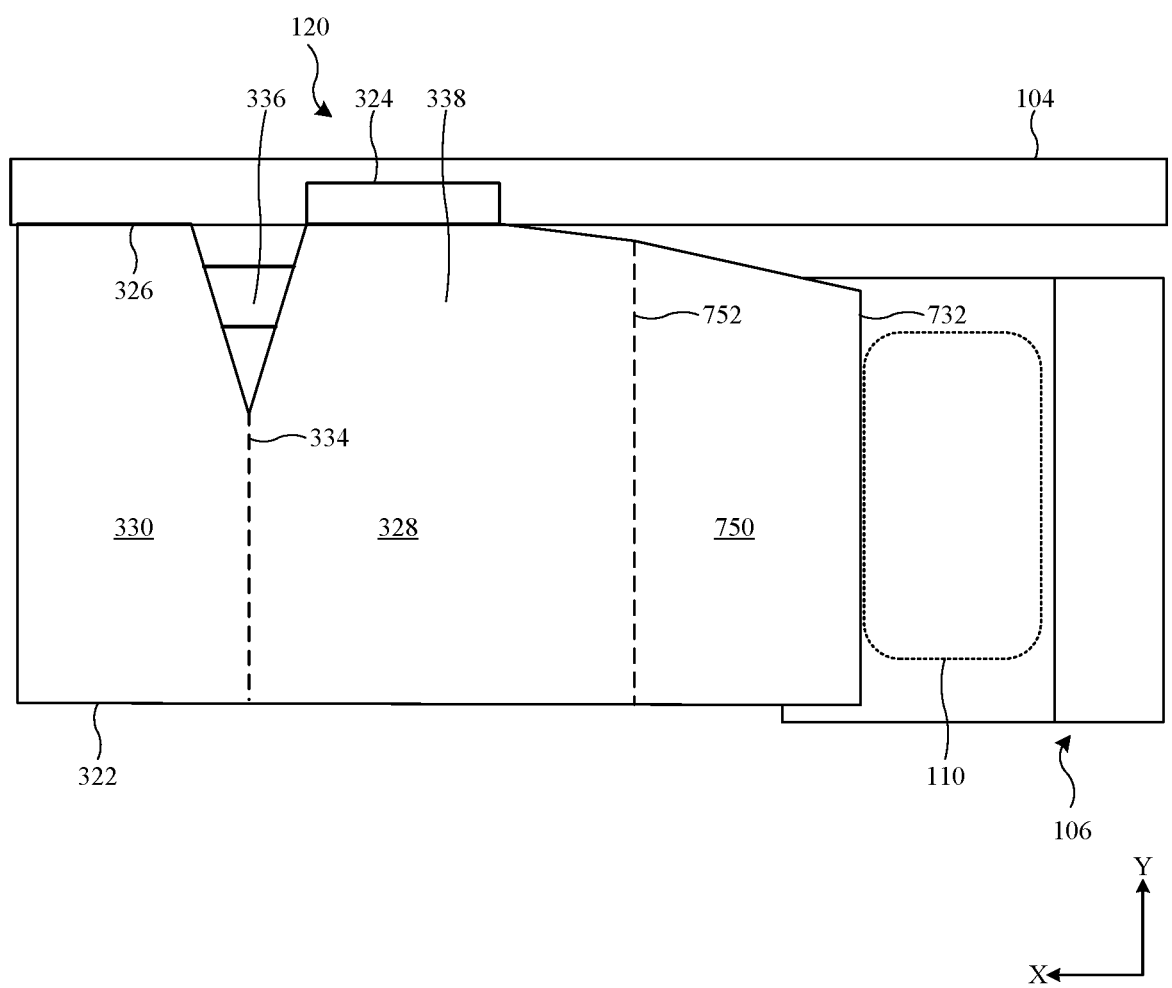
FIG. 7 is a schematic top view illustration of the vehicle including an alternative implementation of an airbag in an inflated position.

In another implementation, as shown in FIG. 7, an alternative implementation of the airbag 122 includes an expandable chamber 750 that is located adjacent to the passenger 101. The passenger-facing surface 332 is omitted in lieu of a passenger-facing surface 732 that is defined on the expandable chamber 750. The expandable chamber 750 is connected to the main chamber 328 at an interface 752. The interface 752 includes structures that allow the expandable chamber 750 to be inflated selectively in dependence on the position of the passenger 101 relative to the housing 124 of the airbag assembly, for example, by inflating if the distance is greater than a threshold distance, or by expanding by an amount selected based on the position of the passenger 101. Thus, the expandable chamber 750 can inflate to reduce the distance between the airbag 122 and the passenger 101. In operation, in response to an actual or imminent collision and based on the position of the passenger 101 with respect to the airbag assembly 120 (e.g., difference from a predetermined position is greater than a threshold value), the expandable chamber 750 may be inflated to reduce the distance between the airbag 122 and the passenger 101.

Figure 8:
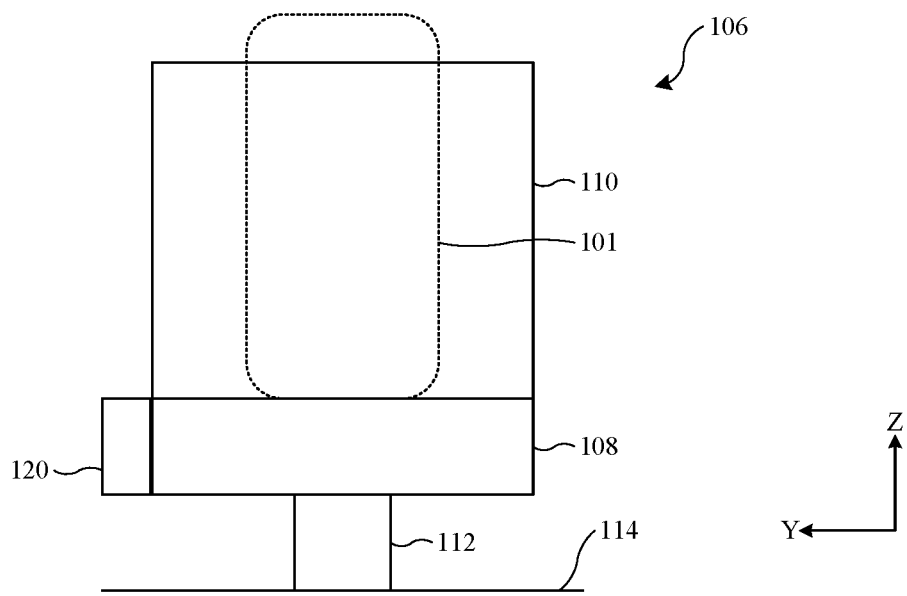
FIG. 8 shows an alternative implementation in which the airbag assembly is mounted along a side of the seat pan of the seat assembly.
Figure 9:
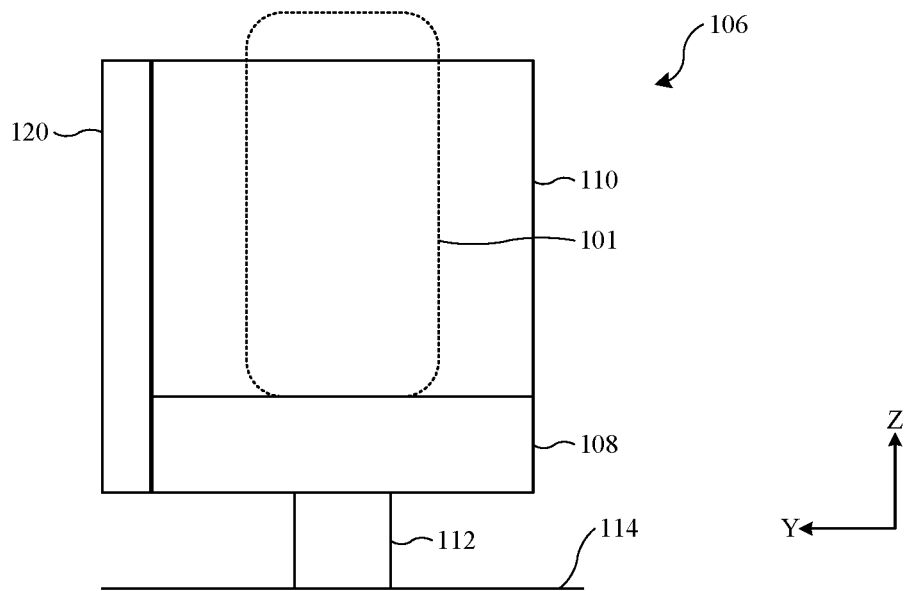
FIG. 9 shows an alternative implementation in which the airbag assembly is mounted along a side of the seat back of the seat assembly.
Figure 10:
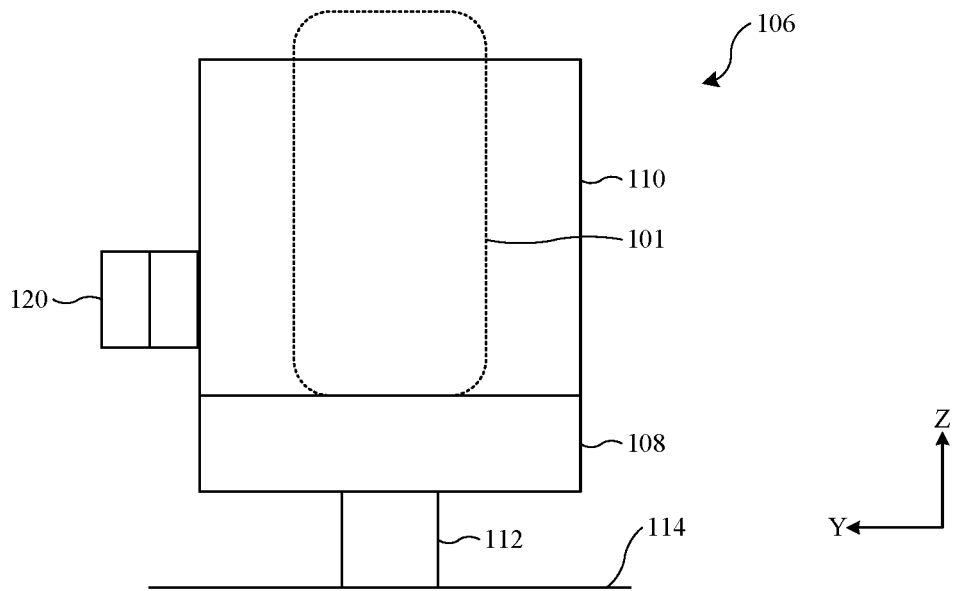
FIG. 10 shows an alternative implementation in which the airbag assembly is mounted to an arm rest of the seat assembly.
Figure 11:
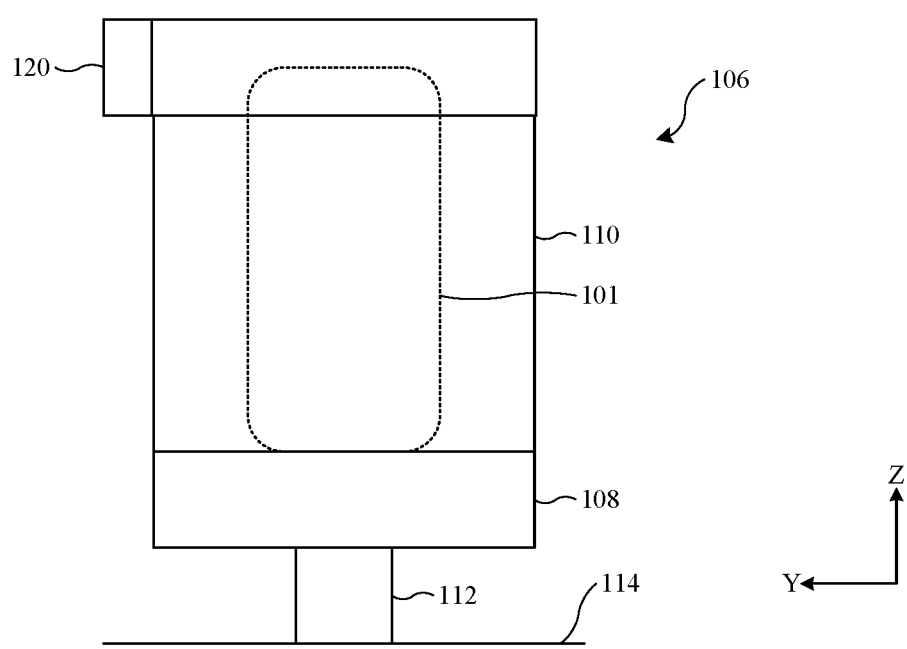
FIG. 11 shows an alternative implementation in which the airbag assembly is mounted to a head rest of the seat assembly.

FIGS. 8-11 relate to implementations in which the airbag assembly 120 is directly connected to the seat assembly 106 and therefore moves with the seat assembly 106 when the seat positioner 116 is used to move the seat assembly 106 (e.g., in the longitudinal direction X). Connection of the airbag assembly 120 to the seat assembly 106 maintains a consistent, predetermined position with respect to the seat assembly 106 when the seat assembly is moved with respect to the body structure 104 of the vehicle 100 without use of the airbag positioner 340, which may be omitted in such embodiments. In the embodiments of FIGS. 8-11, the airbag 122 may be configured to function in the manner described previously, for example by engagement of the reaction chamber 330 of the airbag 122 with a portion of the body structure 104 in response to longitudinal engagement of the passenger 101 with the main chamber 328 of the airbag 122 in order to react longitudinal forces. FIG. 8 shows an alternative implementation in which the airbag assembly 120 is mounted along a side of the seat pan 108 of the seat assembly 106. FIG. 9 shows an alternative implementation in which the airbag assembly 120 is mounted along a side of the seat back 110 of the seat assembly 106. FIG. 10 shows an alternative implementation in which the airbag assembly 120 is mounted to an arm rest of the seat assembly 106. FIG. 11 shows an alternative implementation in which the airbag assembly 120 is mounted to a head rest of the seat assembly 106.

Figure 12:
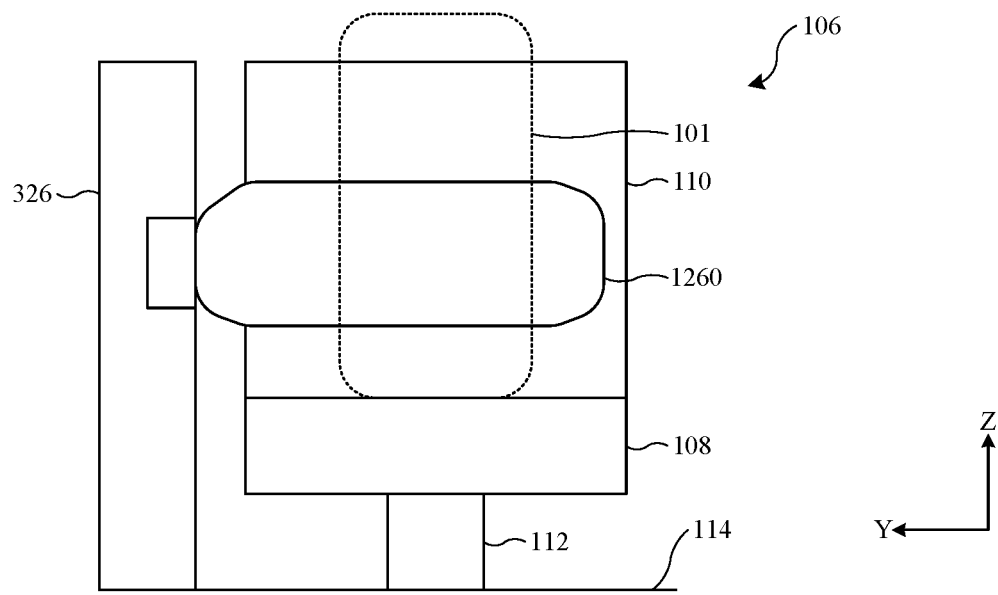
FIG. 12 shows an alternative implementation in which a lap air bag is deployable so that it is positioned between the passenger's torso and the passenger's legs.
Figure 13:
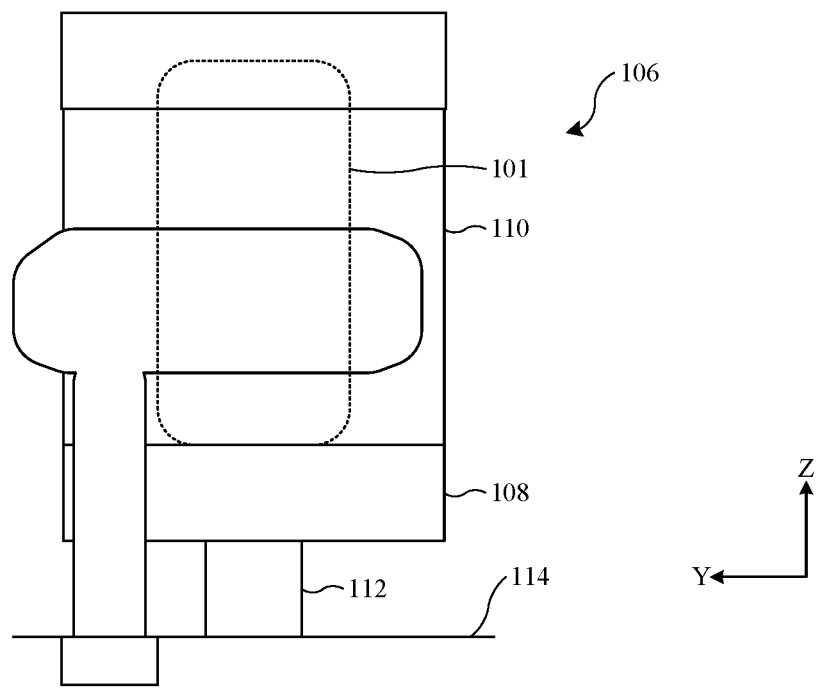
FIG. 13 shows an alternative implementation in which a lap air bag is deployable so that it is positioned between the passenger's torso and the passenger's legs.
Figure 14:
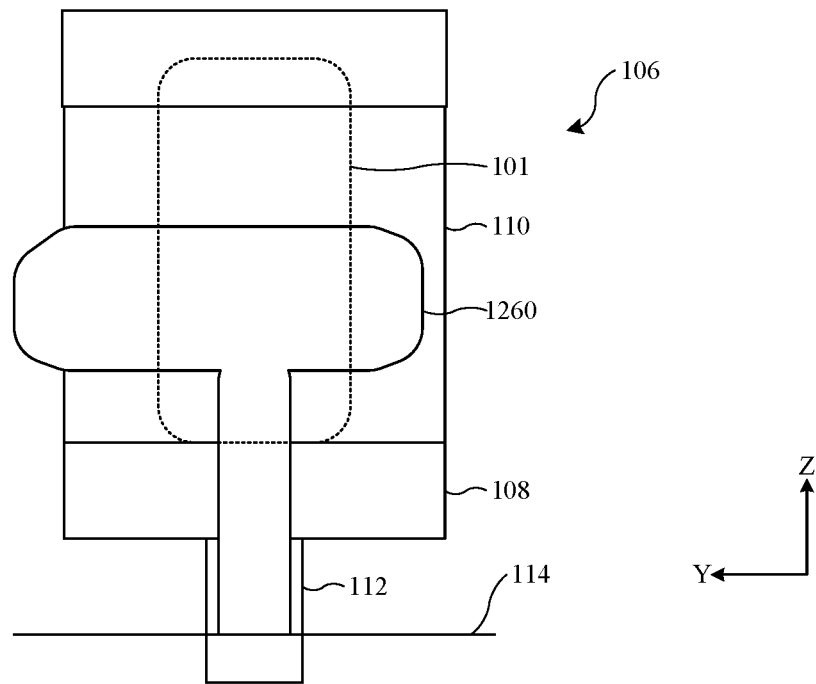
FIG. 14 shows an alternative implementation in which a lap air bag is deployable so that it is positioned between the passenger's torso and the passenger's legs.
Figure 15:
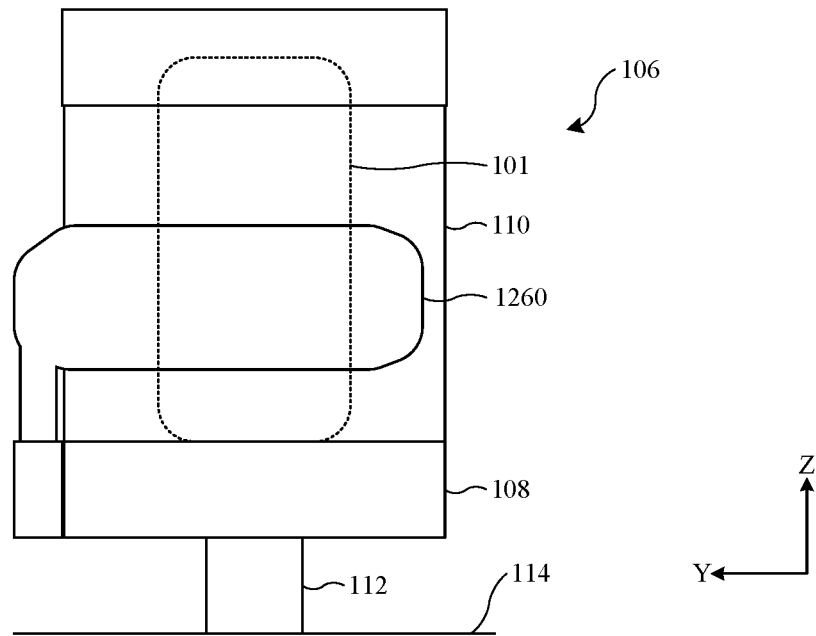
FIG. 15 shows an alternative implementation in which a lap air bag is deployable so that it is positioned between the passenger's torso and the passenger's legs.
Figure 16:
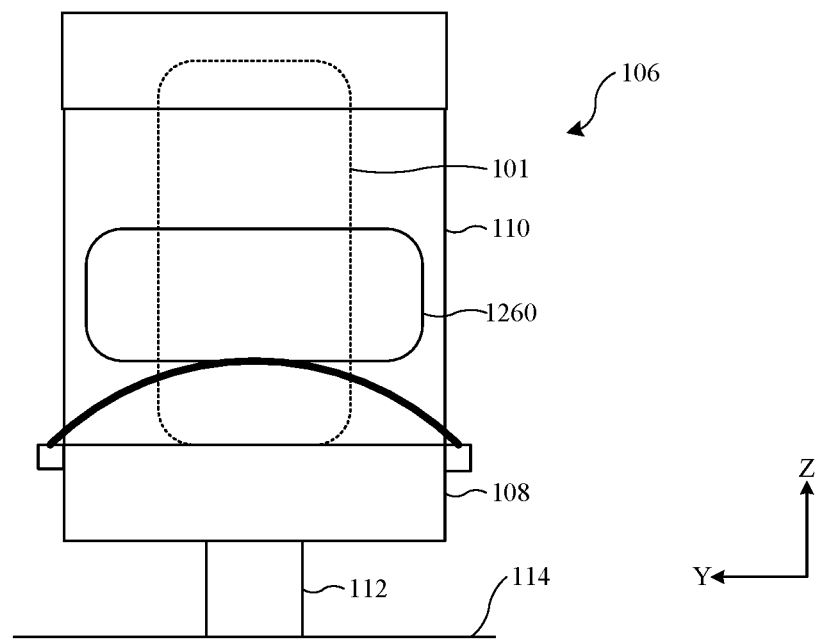
FIG. 16 shows an alternative implementation in which a lap air bag is deployable so that it is positioned between the passenger's torso and the passenger's legs.

FIGS. 12-16 show implementations in which a lap air bag 1260 is deployable so that it is positioned between the passenger's torso and the passenger's legs and includes reaction features in the form of surfaces that engage the passenger's legs to control motion of the passenger's torso. The lap air bag 1260 may, in some implementations, be configured in the manner described with respect to the airbag assembly 120, or other configurations may be used. In FIG. 12, the lap air bag 1260 deploys from the side portion 326 of the body structure 104. In FIG. 13, the lap air bag 1260 deploys from the floor 114 at a lateral side of the seat assembly 106. In FIG. 14, the lap air bag 1260 deploys from the floor 114 centrally relative to the seat assembly 106 (e.g., with a portion extending between the legs of the passenger 101). In FIG. 15, the lap air bag 1260 deploys from a lateral side of the seat pan 108 of the seat assembly 106. In FIG. 16, the lap air bag 1260 deploys from a lap portion of a seat belt that is associated with the seat assembly 106.

Figure 17:
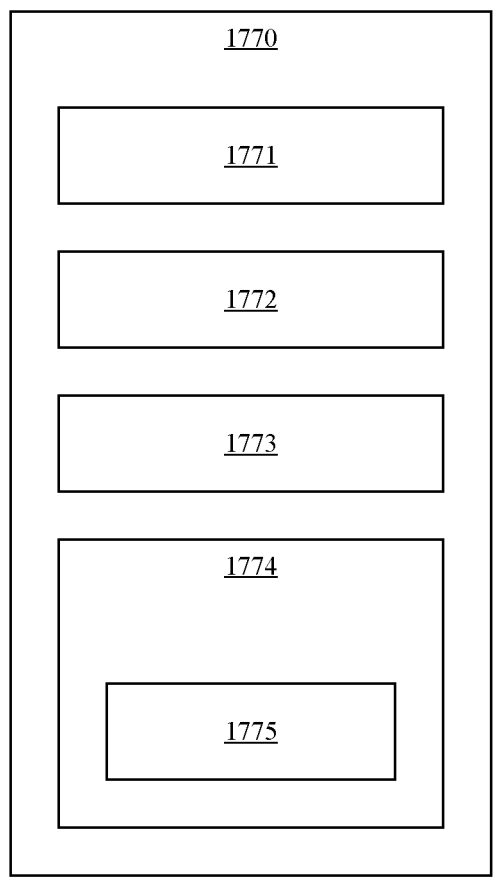
FIG. 17 is a block diagram of a safety system.

FIG. 17 is a block diagram that shows a safety system 1770. The safety system 1770 can include a controller 1771, sensors 1772, a seat system 1773, and an airbag system 1774 that includes reaction features 1775. The safety system 1770 can include components similar to components described in reference to FIGS. 1-16. For example, the seat system 1773 can operate in a manner similar to the seat assembly 106 and may include additional seats configured similarly. The airbag system 1774 and reaction features 1775 can operate in a manner similar to the airbags and reaction features described in connection FIGS. 1-16.

The controller 1771 coordinates operation of the safety system 1770 by facilitating wired of wireless communications between included components of the safety system 1770 and/or other systems of the vehicle. The controller 1771 may receive information (e.g., signals, data, etc.) from the sensors 1772 and may receive information from and/or send information to other portions of the safety system 1770.

The sensors 1772 may capture or receive information related, for example, to components of the safety system 1770, to other systems of the vehicle, and/or to an environment. The environment may include the passenger cabin of the vehicle and an outside environment that is external to the vehicle. Information captured or received by the sensors 1772 can relate to seats, anchors, footrests, occupants within a vehicle, other vehicles, pedestrians and/or objects in the external environment, operating conditions of the vehicle, operating conditions or trajectories of other vehicles, and/or other conditions within the vehicle or exterior to the vehicle.

The safety system 1770 can change an operational mode of the seat system 1773 and/or the airbag system 1774 based on a control signal, such as a signal from the controller 1771. The control signal may be based on information captured or received by the sensors 1772 and may cause various components within the safety system 1770 to change between various operational modes.

Figure 18:
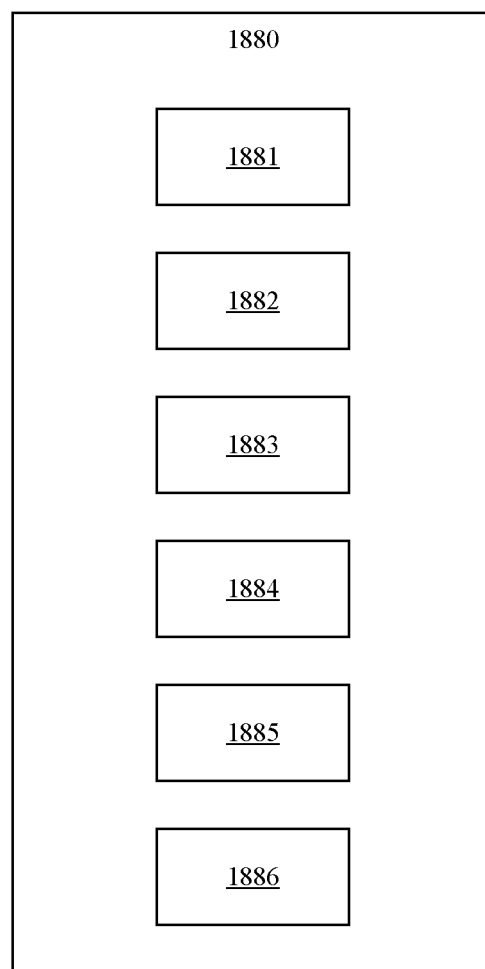
FIG. 18 is an illustration of a hardware configuration for a controller.

FIG. 18 shows an example of a hardware configuration for a controller 1880 that may be used to implement the controller 1771 and/or other portions of the safety system 1770. In the illustrated example, the controller 1880 includes a processor 1881, a memory device 1882, a storage device 1883, one or more input devices 1884, and one or more output devices 1885. These components may be interconnected by hardware such as a bus 1886 that allows communication between the components.

The processor 1881 may be a conventional device such as a central processing unit and is operable to execute computer program instructions and perform operations described by the computer program instructions. The memory device 1882 may be a volatile, high-speed, short-term information storage device such as a random-access memory module. The storage device 1883 may be a non-volatile information storage device such as a hard drive or a solid-state drive. The input devices 1884 may include sensors such as the sensors 1772 and/or any type of human-machine interface, such as buttons, switches, a keyboard, a mouse, a touchscreen input device, a gestural input device, or an audio input device. The output devices 1885 may include any type of device operable to send commands associated with an operating mode or state or provide an indication to a user regarding an operating mode or state, such as a display screen, an interface for a safety system such as the safety system 1770, or an audio output.

As described above, one aspect of the present technology is the gathering and use of data available from various sources, sensors, or user profiles, to operate portions of the safety system. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of personal information data, in the present technology, can be used to the benefit of users. For example, the personal information data can be used to customization operation of the safety system according to user information. Other uses for personal information data that benefit the user are also possible. For instance, health and fitness data may be used to provide insights into a user's general wellness or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users and should be updated as the collection and/or use of data changes. Personal information from users should be collected for legitimate and reasonable uses of the entity and not shared or sold outside of those legitimate uses. Further, such collection/sharing should occur after receiving the informed consent of the users.

Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of user-profile-based safety systems, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can be implemented without the need for accessing such personal information data. That is, the various embodiments of the present technology are not rendered inoperable due to the lack of all or a portion of such personal information data. For example, the safety system can be operated based on non-personal information data, a bare minimum amount of personal information, other non-personal information available to the system, or publicly available information.

What is claimed is:

1. A vehicle, comprising:
   a body structure;
   a seat assembly that is connected to the body structure; and
   an airbag assembly that includes a housing that is located within a first portion of the body structure and an airbag, wherein the first portion of the body structure is a floor panel, the airbag is located in the housing in a stowed position, and the airbag extends outward relative to the housing in an inflated position,
   wherein the airbag includes one or more surfaces that are configured to react forces applied to the airbag by engaging with a first anatomical feature of a passenger to control motion of a second anatomical feature of the passenger,
   wherein the airbag includes a first chamber that extends outward from the housing and a second chamber that reacts the forces,
   wherein the first chamber extends away from the housing toward the passenger in the inflated position, the housing centrally located relative to the seat assembly,
   wherein the second chamber extends laterally from the first chamber in the inflated position, along a first direction toward a first door panel of the body structure, and along a second direction toward a second door panel of the body structure, the second door panel opposite the first door panel,
   wherein the first anatomical feature comprises legs of the passenger, and
   wherein the first chamber is configured to extend between the legs of the passenger in the inflated position.

2. The vehicle of claim 1, wherein the second anatomical feature comprises a torso of the passenger.

3. The vehicle of claim 1, wherein the second chamber is configured to be located between the first anatomical feature and the second anatomical feature when in the inflated position.

4. The vehicle of claim 1, further comprising an inflator configured to supply gas to the airbag to move the airbag from the stowed position to the inflated position.

5. The vehicle of claim 4, wherein the inflator is operated to supply the gas to the airbag based on an actual collision or an imminent collision.

6. A vehicle, comprising:
   a floor;
   a seat; and
   an airbag assembly that includes a housing that is coupled to the floor and a lap airbag that is configured for engagement with a passenger, wherein the lap airbag is located in the housing in a stowed position, the lap airbag is configured to extend outward relative to the housing in an inflated position, and a first portion of the lap airbag is configured to extend between legs of the passenger in the inflated position.

7. The vehicle of claim 6, wherein the lap airbag includes one or more surfaces that are configured to react forces applied to the lap airbag by engaging with a first anatomical feature of the passenger to control motion of a second anatomical feature of the passenger.

8. The vehicle of claim 7, wherein the first anatomical feature comprises the legs of the passenger and the second anatomical feature comprises a torso of the passenger.

9. The vehicle of claim 6, wherein a second portion of the lap airbag is positioned between a torso of the passenger and the legs of the passenger in the inflated position.

10. The vehicle of claim 9, wherein the first portion of the lap airbag is configured to extend outward from the housing and the second portion of the lap airbag is configured to extend laterally from the first portion of the lap airbag in the inflated position.

11. The vehicle of claim 10, wherein the second portion of the lap airbag is configured to extend laterally from the first portion in a first lateral direction and in a second lateral direction that is opposite the first lateral direction.

12. The vehicle of claim 6, further comprising an inflator configured to supply gas to the lap airbag to move the lap airbag from the stowed position to the inflated position.

13. The vehicle of claim 12, wherein the inflator is operated to supply the gas to the lap airbag based on an actual collision or an imminent collision.

14. A vehicle, comprising:
   a floor;
   a seat; and
   an airbag assembly that includes a housing and a lap airbag that is configured for engagement with a passenger, wherein the housing is coupled to the floor and is centrally located relative to the seat, the lap airbag is located in the housing in a stowed position, the lap airbag is configured to extend outward from the housing in an inflated position, and the lap airbag is configured to deploy from the floor centrally relative to the seat wherein a first portion of the lap airbag is configured to extend between legs of the passenger in the inflated position.

15. The vehicle of claim 14, wherein the lap airbag includes one or more surfaces that are configured to react forces applied to the lap airbag by engaging with legs of the passenger to control motion of a torso of the passenger.

16. The vehicle of claim 14, wherein the first portion of the lap airbag is configured to extend outward from the housing, and a second portion of the lap airbag is positioned between a torso of the passenger and legs of the passenger in the inflated position.

17. The vehicle of claim 14, wherein the housing is coupled directly to the floor.

18. The vehicle of claim 14, further comprising an inflator configured to supply gas to the lap airbag to move the lap airbag from the stowed position to the inflated position.

19. The vehicle of claim 18, wherein the inflator is operated to supply the gas to the lap airbag based on an actual collision or an imminent collision.

20. The vehicle of claim 16, wherein the second portion of the lap airbag is configured to extend laterally from the first portion of the lap airbag in the inflated position.

* * * * *